United States Patent
Lee

(10) Patent No.: US 9,435,103 B2
(45) Date of Patent: Sep. 6, 2016

(54) APPARATUS FOR SEMI-AUTOMATICALLY OPENING/CLOSING DOOR OF CONSTRUCTION EQUIPMENT

(75) Inventor: Hwa-Yeol Lee, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 8 days.

(21) Appl. No.: 14/397,377

(22) PCT Filed: May 3, 2012

(86) PCT No.: PCT/KR2012/003478
§ 371 (c)(1),
(2), (4) Date: Oct. 27, 2014

(87) PCT Pub. No.: WO2013/165037
PCT Pub. Date: Nov. 7, 2013

(65) Prior Publication Data
US 2015/0121655 A1   May 7, 2015

(51) Int. Cl.
*E05F 1/06* (2006.01)
*E02F 9/16* (2006.01)
(Continued)

(52) U.S. Cl.
CPC ............... *E02F 9/163* (2013.01); *B60J 5/047* (2013.01); *B66C 13/54* (2013.01); *E05D 7/00* (2013.01);
(Continued)

(58) Field of Classification Search
CPC ............ E05F 1/04; E05F 1/043; E05F 1/06; E05F 1/061; E05F 1/063; Y10T 16/539; Y10T 16/5398
See application file for complete search history.

(56) References Cited

U.S. PATENT DOCUMENTS

| 879,542 | A | * | 2/1908 | Hartman | ................ | E05F 1/063 16/318 |
| 1,034,008 | A | * | 7/1912 | Frey | ........................ | E05F 1/063 16/318 |

(Continued)

FOREIGN PATENT DOCUMENTS

| KR | 10-1995-0006188 A | 3/1995 |
| KR | 20-1998-0042597 U | 9/1998 |

(Continued)

OTHER PUBLICATIONS

International Search Report (in Korean and English) and Written Opinion (in Korean) for PCT/KR2012/003478, mailed Feb. 13, 2013; ISA/KR.

*Primary Examiner* — Jeffrey O Brien
(74) *Attorney, Agent, or Firm* — Harness, Dickey & Pierce, P.L.C.

(57) ABSTRACT

Disclosed is an apparatus for opening/closing a door in which the door can be semi-automatically closed in a preset section so as to enable an operator in an operating cab to easily close the door. The apparatus for semi-automatically opening/closing door of construction equipment according to the present invention comprises: an upper hinge mounted on the door and having a first receiving hole; an upper option pin which is detachably coupled to a bottom surface of the upper hinge and the bottom surface of which has a first plane and a first inclined surface extending from the first plane; a lower hinge mounted on an operating cab and having a second receiving hole; a lower option pin which is detachably coupled to an upper surface of the lower hinge and the upper surface of which has a second plane and a second inclined surface extending from the second plane; and a guide pin, the upper end of which penetrates through the upper option pin and is coupled to the first receiving hole of the upper hinge, and the lower end of which penetrates through the lower option pin and is coupled to the second receiving hole of the lower hinge.

8 Claims, 4 Drawing Sheets

(51) Int. Cl.
  *B60J 5/04* (2006.01)
  *B66C 13/54* (2006.01)
  *E05D 7/00* (2006.01)

(52) U.S. Cl.
  CPC ............ *E05F 1/063* (2013.01); *E05Y 2800/70* (2013.01); *E05Y 2900/518* (2013.01); *E05Y 2900/531* (2013.01); *Y10T 16/5398* (2015.01)

(56) References Cited

U.S. PATENT DOCUMENTS

| | | | | |
|---|---|---|---|---|
| 3,083,402 A * | 4/1963 | Foltz | ................ | E05D 3/08 16/318 |
| 3,107,758 A * | 10/1963 | Benham | ................ | E05F 1/1223 16/284 |
| 4,631,777 A * | 12/1986 | Takimoto | ................ | E05F 1/063 16/312 |
| 4,697,306 A * | 10/1987 | Rhodes | ................ | E05F 1/063 16/317 |
| 5,500,984 A * | 3/1996 | Lee | ................ | E05F 1/063 16/309 |
| 6,990,772 B2 * | 1/2006 | Eckel | ................ | E05D 3/08 16/316 |
| 7,000,289 B2 * | 2/2006 | Cedrone | ................ | E05F 1/063 16/273 |
| 7,013,531 B2 * | 3/2006 | Jackson | ................ | E05F 1/063 16/309 |
| 7,945,996 B2 * | 5/2011 | Gunderson | ................ | E05F 1/061 16/303 |
| 2004/0231106 A1 * | 11/2004 | Shire | ................ | E05D 5/06 16/390 |
| 2005/0011046 A1 * | 1/2005 | Dionysian | ................ | E05F 1/063 16/316 |
| 2005/0246863 A1 * | 11/2005 | Chesworth | ................ | E05F 1/063 16/221 |

FOREIGN PATENT DOCUMENTS

| | | |
|---|---|---|
| KR | 20-1998-0061783 U | 11/1998 |
| KR | 20-0391489 Y | 8/2005 |
| KR | 10-2005-0097056 A | 10/2005 |

* cited by examiner

APPARATUS FOR SEMI-AUTOMATICALLY OPENING/CLOSING DOOR OF CONSTRUCTION EQUIPMENT

FIELD OF THE INVENTION

The present invention relates to an apparatus for semi-automatically opening and closing an operator's cab door of a construction machine. More particularly, the present invention relates to a semi-automatic door opening and closing apparatus for a construction machine, which enables an operator in a cab to easily close the door through the semi-automatic closing of the door in a preset section.

BACKGROUND OF THE INVENTION

As shown in FIG. 1, a door opening and closing apparatus for a construction machine in accordance with the prior art includes a hinge 2 consisting of a first hinge unit 2a mounted on an operator's cab 1 and a second hinge unit 2b mounted on a door 3 so as to perform a relative rotation with respect to the upper hinge unit 2a so that the door 3 can be opened or closed by the hinge 2. A handrail is mounted on the operator's cab 1 so that the door 3 can be opened or closed. In case of a small-sized construction machine, the inner space of the operator's cab 1 is small, and thus the handrail cannot be mounted on the operator's cab 1.

The above-mentioned hinge 2 has an advantage in that the manufacturing cost is decreased and its manufacture is easy due to simplicity of structure. On the other hand, in the case where the door 3 is opened at a maximum angle, the door 3 is far away from an entrance of the operator's cab 1.

For this reason, an operator suffers from an inconvenience of having to sticking a part of his or her body out of the operator's cab 1 in order for the operator in the operator's cab 1 to close the door 3. In addition, the conventional door opening and closing apparatus for a construction machine entails a problem in that the operator loses a body balance during the closing the door 3 and thus falls down from an operator's seat, which cause an injury to him or her.

DETAILED DESCRIPTION OF THE INVENTION

Technical Problems

Accordingly, the present invention has been made to solve the aforementioned problem occurring in the prior art, and it is an object of the present invention to provide a semi-automatic door opening and closing apparatus for a construction machine, in which a door of an operator's cab is closed semi-automatically in a preset section even without a separate closing device so that an operator in the operator's cab can close the door conveniently.

Another object of the present invention is to provide a semi-automatic door opening and closing apparatus for a construction machine, in which the necessity for a handrail for opening and closing a door of an operator's cab can be eliminated to utilize the inner space of the cab and the operator is protected from a safety accident occurring during the closing of the door.

Still another object of the present invention is to provide a semi-automatic door opening and closing apparatus for a construction machine, which can provide a user with, as an option apparatus, an opening and closing apparatus configured to adjust a preset section in which a door of an operator's cab is closed semi-automatically and a speed at which the door is closed.

Technical Solution

To accomplish the above object, in accordance with an embodiment of the present invention, there is provided a semi-automatic door opening and closing apparatus for a construction machine having a door openably and closably mounted on an operator's cab, the apparatus including:

an upper hinge mounted on the door, the upper hinge having a first seating hole formed therein and a rotation prevention means formed on an underside thereof;

an upper option pin having a rotation prevention means formed on a top surface thereof, which is in close contact with the underside of the upper hinge to prevent idling of the upper option pin during the opening and closing of the door, a first plane formed on an underside thereof, and a first inclined surface formed on the underside thereof so as to extend from the first plane, the upper option pin being penetratingly formed internally;

a lower hinge mounted on the cab so as to perform a relative rotation with respect to the upper hinge, the lower hinge having a second seating hole formed therein and a rotation prevention means formed on a top surface thereof;

a lower option pin having a rotation prevention means formed on an underside thereof, which is in close contact with the top surface of the lower hinge to prevent idling of the upper option pin during the opening and closing of the door, a second plane formed on a top surface thereof, and a second inclined surface formed on the top surface thereof so as to extend from the second plane, the lower option pin being penetratingly formed internally; and a guide pin having an upper end coupled to the first seating hole of the upper hinge so as to penetrate through the option pin and a lower end coupled to the second seating hole of the lower hinge so as to penetrate through the lower option pin, wherein if an external force applied to the door is removed after opening the door in a state where the lower hinge is securely fixed to the cab and the upper hinge is mounted on the door 10, the first inclined surface of the upper option pin is rotated to slide along the second inclined surface of the lower option pin by the door's own weight, so that the door is semi-automatically closed in a preset section.

In accordance with a preferred embodiment, the semi-automatic door opening and closing apparatus may further include a first concavo-convex portion formed on the underside of the upper hinge and the top surface of the upper option pin that is in close contact with the underside of the upper hinge in a corresponding shape so that the assembling directions of the upper hinge and the upper option pin are not changed with each other, and a second concavo-convex portion formed on the top surface of the lower hinge and the underside of the lower option pin that is in close contact with the top surface of the lower hinge in a corresponding shape so that the assembling directions of the lower hinge and the lower option pin are not changed with each other.

The first and second concavo-convex portions may be formed in a combination of any two of a triangular shape, a semi-circular shape, and a polygonal shape.

The width of the first plane of the upper option pin may be formed to be relatively smaller than the width of the second plane of the lower option pin, and an inclination angle of a closed section in which the door is semi-automatically closed is variably adjusted depending on the adjustment of the width of the second plane.

Advantageous Effect

The semi-automatic door opening and closing apparatus for a construction machine in accordance with an embodiment of the present invention as constructed above has the following advantages.

A door of an operator's cab is closed semi-automatically in a preset section even without a separate closing device (i.e., hydraulic device or electric device) so that an operator in the operator's cab can close the door conveniently, thereby ensuring convenience in use and practicality.

In addition, the necessity for a handrail for opening and closing a door of an operator's cab can be eliminated to usefully utilize a small inner space of the cab and the operator can protected from a safety accident occurring during the closing of the door, thereby ensuring reliability.

Besides, the present invention provides a user with, as an option apparatus, an opening and closing apparatus capable of adjusting a preset section in which a door of an operator's cab is closed semi-automatically and a speed at which the door is closed, and thus the user possessing a construction machine used in various work environments can work by usefully selecting a section in which the door is closed or a speed at which the door is closed.

BRIEF DESCRIPTION OF THE INVENTION

The above objects, other features and advantages of the present invention will become more apparent by describing the preferred embodiments thereof with reference to the accompanying drawings, in which.

Figure 6:
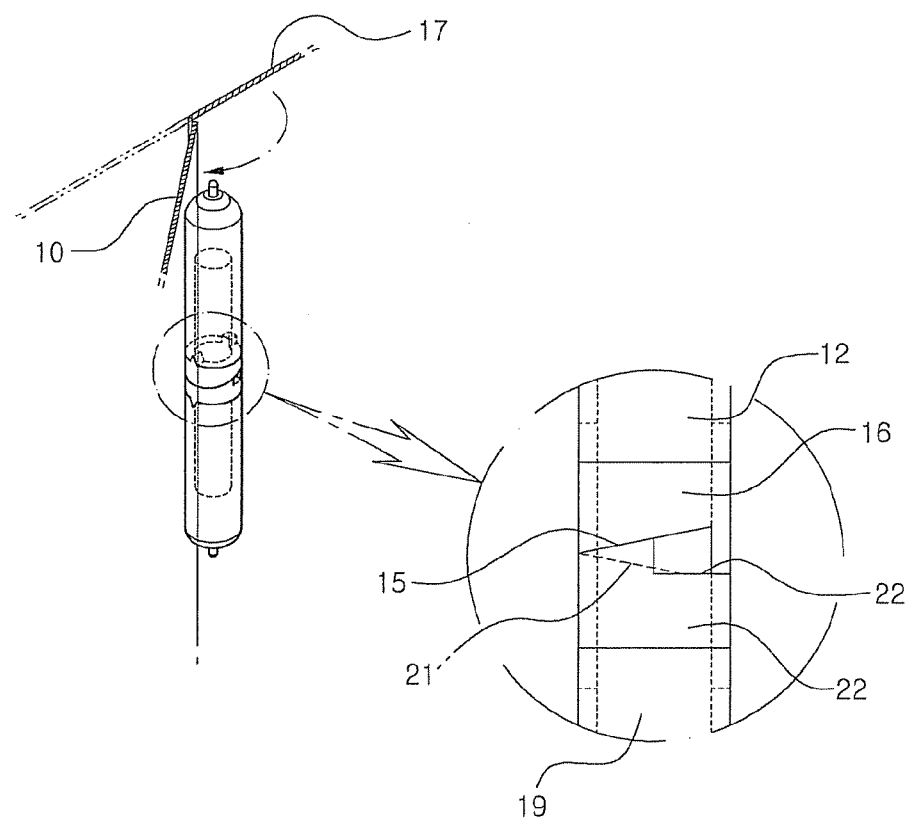
Figure 7:
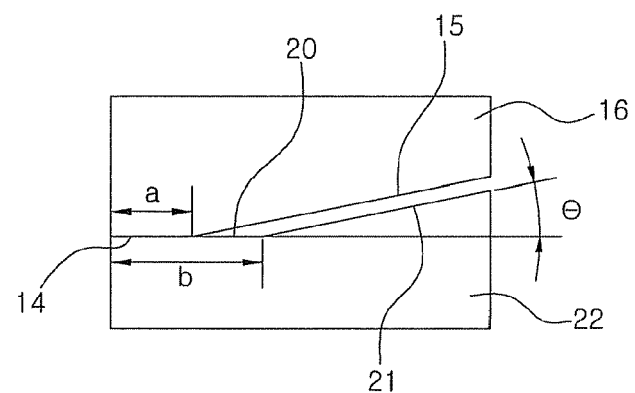

FIG. 6 is a view showing deviation from a closed section in which a door is closed semi-automatically in a semi-automatic door opening and closing apparatus for a construction machine in accordance with an embodiment of the present invention; and FIG. 7 is a view showing a state in which the upper and lower option pins are developed in a semi-automatic door opening and closing apparatus for a construction machine in accordance with an embodiment of the present invention.

*Explanation on reference numerals of main elements in the drawings
10: door
11: first seating hole
12: upper hinge
14: first plane
15: first inclined surface
16: upper option pin
17: operator's cab
18: second seating hole
19: lower hinge
20: second plane
21: second inclined surface
22: lower option pin
23: guide pin
24: first concavo-convex portion
25: second concavo-convex portion

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

As shown in FIGS. 2 to 7, a semi-automatic door opening and closing apparatus for a construction machine having a door openably and closably mounted on an operator's cab 17 in accordance with an embodiment of the present invention includes:

an upper hinge 12 mounted on the door 10, the upper hinge having a first seating hole 11 formed therein and a rotation prevention means formed on an underside thereof;

an upper option pin 16 having a rotation prevention means (for example, concavo-convex portion shaped like a gear tooth) formed on a top surface thereof, which is in close contact with the underside of the upper hinge 12 to prevent idling of the upper option pin during the opening and closing of the door 10, a first plane 14 formed on an underside thereof, and a first spirally-inclined surface 15 formed on the underside thereof so as to extend from the first plane 14, the upper option pin 16 being penetratingly formed internally;

a lower hinge 19 mounted on the cab 17 so as to perform a relative rotation with respect to the upper hinge 12, the lower hinge 19 having a second seating hole 18 formed therein and a rotation prevention means formed on a top surface thereof;

a lower option pin 22 having a rotation prevention means (for example, concavo-convex portion shaped like a gear tooth) formed on an underside thereof, which is in close contact with the top surface of the lower hinge 19 to prevent idling of the upper option pin during the opening and closing of the door 10, a second plane 20 formed on a top surface thereof, and a second spirally-inclined surface 21 formed on the top surface thereof so as to extend from the second plane 20, the lower option pin 22 being penetratingly formed internally; and a guide pin 23 having an upper end coupled to the first seating hole 11 of the upper hinge 12 so as to penetrate through the option pin 16 and a lower end coupled to the second seating hole 18 of the lower hinge 19 so as to penetrate through the lower option pin 22, wherein if an external force applied to the door 10 is removed after opening the door 10 in a state where the lower hinge 19 is securely fixed to the cab 17 and the upper hinge 12 is mounted on the door 10, the first inclined surface 15 of the upper option pin 16 is rotated to slide along the second inclined surface 21 of the lower option pin 22 by the door's own weight, so that the door 10 is semi-automatically closed in a preset section.

In this case preferably, the semi-automatic door opening and closing apparatus further includes a first concavo-convex portion 24 formed on the underside of the upper hinge 12 and the top surface of the upper option pin 16 that is in close contact with the underside of the upper hinge 12 in a corresponding shape so that the assembling directions of the upper hinge 12 and the upper option pin 16 are not changed with each other, and a second concavo-convex portion 25 formed on the top surface of the lower hinge 19 and the underside of the lower option pin 22 that is in close contact with the top surface of the lower hinge 19 in a corresponding shape so that the assembling directions of the lower hinge 19 and the lower option pin 22 are not changed with each other.

The first and second concavo-convex portions 24 and 25 are formed in a combination of any two of a triangular shape, a semi-circular shape, and a polygonal shape. For example, it is illustrated in the drawings that each of the first and second concavo-convex portions 24 and 25 is formed in a triangular shape and a quadrangular shape.

The width a of the first plane 14 of the upper option pin 16 is formed to be relatively smaller than the width b of the second plane 20 of the lower option pin 22, and an inclination angle θ of a closed section in which the door 10 is semi-automatically closed is variably adjusted depending on the adjustment of the width b of the second plane 20. In other words, the inclination angle of the first inclined surface 15 of the upper option pin 16 and the second inclined surface 21 of the lower option pin 22 can variably adjust the speed at which the door 10 is semi-automatically closed.

Hereinafter, a use example of the semi-automatic door opening and closing apparatus for a construction machine in accordance with an embodiment of the present invention will be described in detail with reference to the accompanying drawings.

As shown in FIGS. 2 to 7, a cylindrical upper hinge 12 is weldingly fixed to the door 10 and a cylindrical lower hinge 19 is weldingly fixed to an operator's cab 17. The lower option pin 22 is contactingly coupled to the top surface of the lower hinge 19 and the upper option pin 16 is contactingly coupled to the underside of the upper hinge 12. In this case, when the door 10 is opened or closed, idling of the lower option pin 22 can be prevented by a rotation prevention means (i.e., a second concavo-convex portion 25 formed in a combination of a triangular shape and a quadrangular shape) formed in a mutually corresponding shape on the top surface of the lower hinge 19 and the underside of the lower option pin 22.

In addition, when the door 10 is opened or closed, idling of the upper option pin 16 can be prevented by a rotation prevention means (i.e., a first concavo-convex portion 24 formed in a combination of a triangular shape and a quadrangular shape) formed in a mutually corresponding shape on the underside of the upper hinge 12 and the top surface of the upper option pin 16.

A lower end of the guide pin 23 is caused to pass through the lower option pin 22 and then is coupled to the second seating hole 18 of the lower hinge 19, and an upper end of the guide pin 23 is caused to pass through the upper option pin 16 and then is coupled to the first seating hole 11 of the upper hinge 12.

Thus, the upper hinge 12 integrally coupled with the upper option pin 16 performs a relative rotation with respect to the lower hinge 19 integrally coupled with the upper option pin 22. For this reason, the door 10 can be opened or closed with respect to the operator's cab 17 in a sliding manner.

Meanwhile, in the case where the upper option pin 16 is coupled to the upper hinge 12 or the lower option pin 22 is coupled to the lower hinge 19, the directions in which the upper option pin 16 and the lower option pin 22 are respectively assembled with the upper hinge 12 and the lower hinge 19 can be maintained constantly by means of the first or second concavo-convex portion 24 or 25 formed in a mutually corresponding shape on the contacting surfaces between the lower option pin 22 and the lower hinge 19 or the upper option pin 16 and the upper hinge 12.

Figure 1:
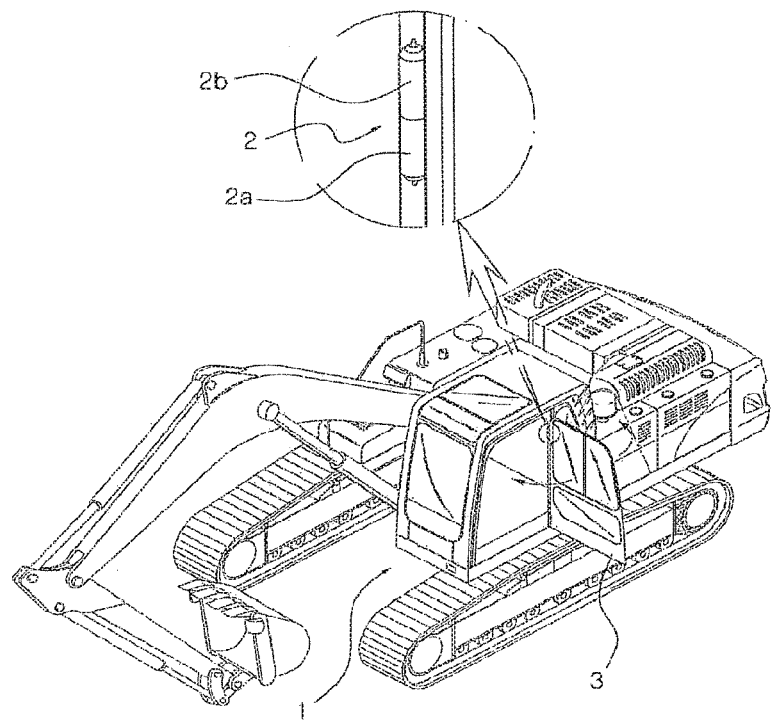
FIG. 1 is a perspective view showing a use state of a door opening and closing apparatus for a construction machine in accordance with the prior art.
Figure 2:
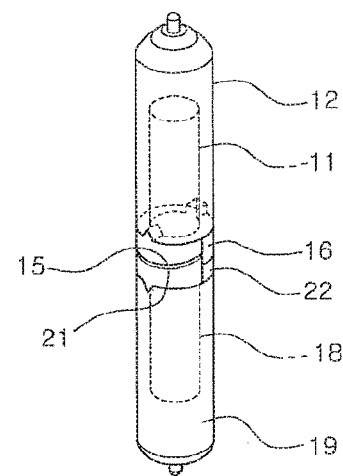
FIG. 2 is an assembled perspective view showing a hinge unit in a semi-automatic door opening and closing apparatus for a construction machine in accordance with an embodiment of the present invention.
Figure 3:
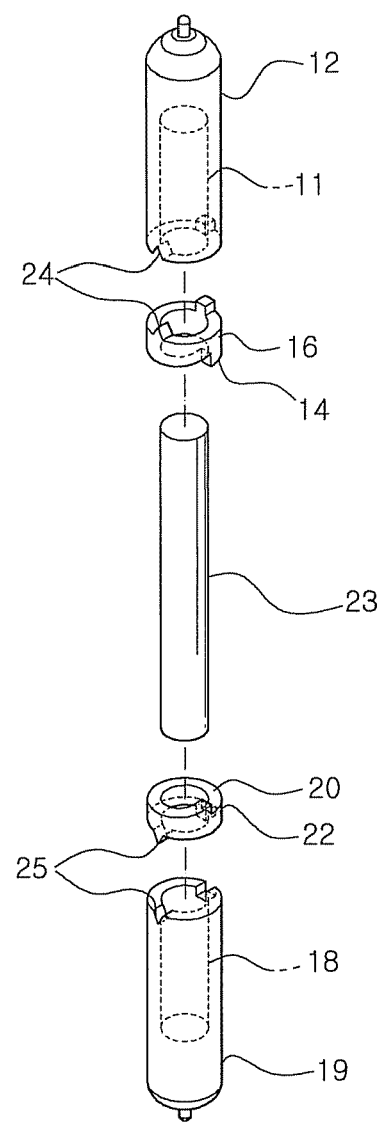
FIG. 3 is an exploded perspective view showing a hinge unit in a semi-automatic door opening and closing apparatus for a construction machine in accordance with an embodiment of the present invention.
Figure 4:
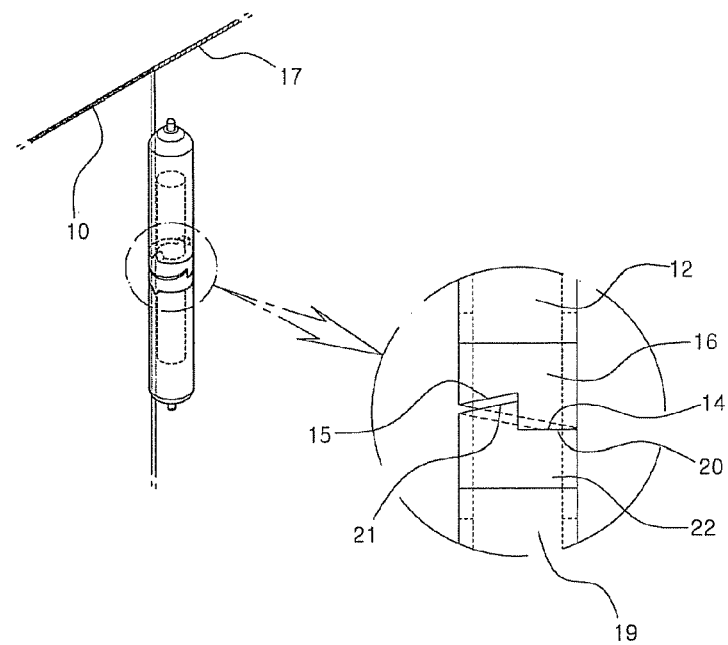
FIG. 4 is a view showing an initial state in which a door is closed in a semi-automatic door opening and closing apparatus for a construction machine in accordance with an embodiment of the present invention.

FIG. 4 is a view showing an initial state in which a door is closed in a semi-automatic door opening and closing apparatus for a construction machine in accordance with an embodiment of the present invention.

As shown in FIG. 4, the first plane 14 formed on the underside of the upper potion pin 16 and the second plane 20 formed on the top surface of the lower option pin 22 are in close contact with each other. The first spirally-inclined surface 15 of the upper option pin 16 and the second spirally-inclined surface 21 of the lower option pin 22 are spaced apart from each other by a predetermined distance.

Figure 5:
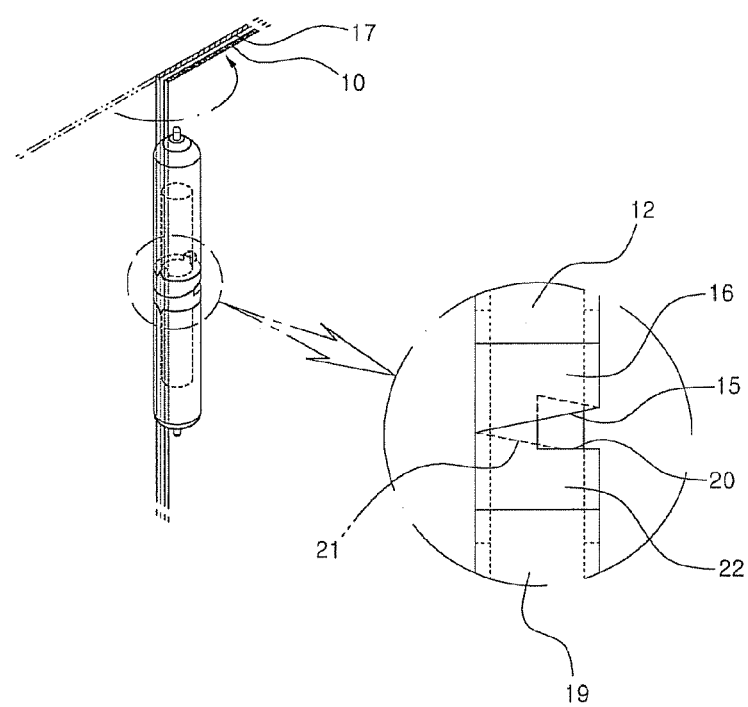
FIG. 5 is a view showing a state in which a door is opened by 180 degrees in a semi-automatic door opening and closing apparatus for a construction machine in accordance with an embodiment of the present invention.

FIG. 5 is a view showing a state in which an operator opens the door 10 by 180 degrees with him or her gripping a doorknob (not shown) of the door 10.

The first inclined surface 15 of the upper option pin 16 is spirally rotated while sliding along the second inclined surface 21 of the lower option pin 22, and the first plane 14 of the upper potion pin 16 is separated from the second plane 20 of the lower option pin 22.

Thus, the upper hinge 12 is rotated in a counterclockwise direction about the guide pin 23 used as a central shaft so that the door 10 can be pivoted to be opened in a counterclockwise direction in a sliding manner.

FIG. 6 is a view showing deviation from a closed section in which a door is closed semi-automatically in a semi-automatic door opening and closing apparatus for a construction machine in accordance with an embodiment of the present invention.

In the case where an external force applied to the door 10 to open the door 10 is removed, the door 10 is closed semi-automatically in the preset section by its own weight. In other words, when an operator detaches his or her hand which is opening the door 10 from the door 10, the first inclined surface 15 of the upper option pin 16 is spirally rotated in a clockwise direction while sliding along the second inclined surface 21 of the lower option pin 22

In this case, when the first plane 14 of the upper option pin 16 returns to the second plane 20 of the lower option pin 22 so that the first plane 14 is brought into close contact with the second plane 20, a closing operation in which the door 10 is closed semi-automatically is stopped. That is, the door 10 is maintained in a state of being closed by an opened and closed angle (i.e., 120 degrees) that equals to two thirds of its fully opened and closed angle (i.e., 180 degrees).

Thus, an operator in the operator's cab 17 extends his or her hand to the door 10 so that the door 10 can be easily closed manually. In other words, the door 10 can be closed semi-automatically by an opened and closed angle (i.e., 120 degrees) that equals to two thirds of its fully opened and closed angle, and can be closed manually by an opened and closed angle (i.e., 60 degrees) that equals to one thirds of its fully opened and closed angle.

In the meantime, the speed at which the door 10 is closed semi-automatically can be variably adjusted depending on the inclination angle of the second inclined surface 21 of the lower option pin 22 and the first inclined surface 15 of the upper option pin 16.

In addition, an inclination angle of a closed section in which the door 10 is semi-automatically closed can be variably adjusted depending on the adjustment of the width b of the second plane 20 of the lower option pin 22. If the width b of the second plane 20 of the lower option pin 22 is reduced, the inclined section of the second inclined surface 21 is increased and thus the closed section in which the door 10 is semi-automatically closed is also increased. That is, the door 10 is pivoted to be closed up to a position approaching the entrance of the operator's cab 17.

On the other hand, if the width b of the second plane 20 of the lower option pin 22 is increased, the inclined section of the second inclined surface 21 is shortened and thus the closed section in which the door 10 is semi-automatically closed is also shortened. That is, the closed position where the door 10 is semi-automatically closed is far away from the entrance of the operator's cab 17.

Meanwhile, in the case where the upper option pin 16 and the lower option pin 22 are physically damaged or abraded according to the repeated opening and closing operation of the door 10, they can be replaced with new ones. In other words, since the upper and lower option pins 16 and 22 are detachably coupled to the upper and lower hinges 12 and 19, respectively, in a concavo-convex engagement manner, they are easily separated from the upper and lower hinges 12 and 19.

INDUSTRIAL APPLICABILITY

As described above, according to the semi-automatic door opening and closing apparatus for a construction machine in accordance with an embodiment of the present invention, A door of an operator's cab is closed semi-automatically in a preset section even without a separate closing device so that an operator in the operator's cab can close the door stably and conveniently. In addition, the necessity for a handrail for opening and closing the door can be eliminated to usefully utilize the inner space of the cab.

Furthers, an operator can work by usefully selecting a section in which a door of a construction machine used in various work environments is closed or a speed at which the door is closed.

The invention claimed is:

1. A semi-automatic door closing apparatus for a construction machine having a door openably and closably mounted on an operator's cab, the apparatus comprising:
    an upper hinge configured to be mounted on the door, the upper hinge having a first seating hole formed therein and a first rotation prevention member formed on an underside thereof;
    an upper sleeve having a second rotation prevention member formed on a top surface thereof, which is in close contact with the underside of the upper hinge to prevent idling of the upper sleeve during the opening and closing of the door, a first plane formed on an underside thereof, a first inclined surface formed on the underside thereof so as to extend directly from the first plane, and a first vertical surface to which the first inclined surface extends directly to, the first vertical surface extends from the first inclined surface to the first plane in a direction perpendicular to the first plane, the upper sleeve being penetratingly formed internally;
    a lower hinge configured to be mounted on the cab so as to perform a relative rotation with respect to the upper hinge, the lower hinge having a second seating hole formed therein and a third rotation prevention member formed on a top surface thereof;
    a lower sleeve having a fourth rotation prevention member formed on an underside thereof, which is in close contact with the top surface of the lower hinge to prevent idling of the lower sleeve during the opening and closing of the door, a second plane formed on a top surface thereof, a second inclined surface formed on the top surface thereof so as to extend directly from the second plane, and a second vertical surface to which the second inclined surface extends directly to, the second vertical surface extends from the second inclined surface to the second plane in a direction perpendicular to the second plane, the lower sleeve being penetratingly formed internally; and
    a guide pin having an upper end coupled to the first seating hole of the upper hinge so as to penetrate through the upper sleeve and a lower end coupled to the second seating hole of the lower hinge so as to penetrate through the lower sleeve;
    wherein when an external force applied to the door is removed after opening the door in a state where the lower hinge is securely fixed to the cab and the upper hinge is mounted on the door, the first inclined surface of the upper sleeve is rotated to slide along the second inclined surface of the lower sleeve by the door's own weight, so that the door is semi-automatically closed in a preset section; and
    wherein a width of the first plane of the upper sleeve is formed to be relatively smaller than a width of the second plane of the lower sleeve, and an inclination angle of a closed section in which the door is semi-automatically closed is variably adjusted depending on the adjustment of the width of the second plane.

2. The semi-automatic door closing apparatus according to claim 1, comprising the first rotation prevention member forming a first concavo-convex portion formed on the underside of the upper hinge and the top surface of the upper sleeve that is in close contact with the underside of the upper hinge in a corresponding shape so that assembling directions of the upper hinge and the upper sleeve are not changed with each other, and the second rotation prevention member forming a second concavo-convex portion formed on the top surface of the lower hinge and the underside of the lower sleeve that is in close contact with the top surface of the lower hinge in a corresponding shape so that the lower hinge and the lower sleeve are easily engaged with each other.

3. The semi-automatic door closing apparatus according to claim 2, wherein the first and second concavo-convex portions and are formed in a combination of any two of a triangular shape, a semi-circular shape, and a polygonal shape.

4. The semi-automatic door closing apparatus according to claim 1, wherein the door is semi-automatically closed about two-thirds of a fully opened position.

5. The semi-automatic door closing apparatus according to claim 1, wherein the door is semi-automatically closed to within about 60 degrees of a fully closed position.

6. A semi-automatic door closing apparatus for a construction machine having a door openably and closably mounted on an operator's cab, the apparatus comprising:
    an upper hinge configured to be rigidly affixed to the door, the upper hinge defining a first seating hole formed therein and a first rotation prevention member formed about an opening of the first seating hole;

an upper collar including: a second rotation prevention member formed at a top surface thereof that is configured to fixedly cooperate with the first rotation prevention member to prevent rotation of the upper collar during opening and closing of the door; a first planar surface formed on an underside of the upper collar that is opposite to the top surface of the upper collar; a first ramped surface extending directly from the first planar surface towards the top surface; a first vertical surface to which the first ramped surface extends directly to, the first vertical surface extends from the first ramped surface to the first planar surface in a direction perpendicular to the first planar surface; and a first aperture defined at a center of the upper collar;

a lower hinge configured to be affixed to the cab, the lower hinge defining a second seating hole formed therein and a third rotation prevention member formed on a top surface thereof;

a lower collar including: a fourth rotation prevention member formed on an underside thereof that is configured to fixedly cooperate with the third rotation prevention member to prevent rotation of the lower collar during opening and closing of the door; a second planar surface formed on a top surface of the lower collar that is opposite to the underside of the lower collar; a second ramped surface extending directly from the second planar surface away from the underside of the lower collar; a second vertical surface to which the second ramped surface extends directly to, the second vertical surface extends from the second ramped surface to the second planar surface in a direction perpendicular to the second planar surface; and a second aperture defined at a center of the lower collar;

a guide pin extending through the first aperture of the upper collar and into the first seating hole of the upper hinge such that a first end of the guide pin is seated within the first seating hole, the guide pin further extending through the second aperture of the lower collar and into the second seating hole of the lower hinge such that a second end of the guide pin is seated within the second seating hole;

wherein:
a first width of the first planar surface of the upper collar is less than a second width of the second planar surface of the lower collar;
the door moves under the door's own weight from an open position to a semi-closed position spaced apart from the operator's cab as the first planar surface slides down the second ramped surface to the second planar surface;
the semi-closed position is spaced apart a first distance from the operator's cab when the second planar surface has a first width and the second ramped surface has a first length; and
the semi-closed position is spaced apart from the operator's cab at a second distance that is greater than the first distance when the second planar surface has a second width that is greater than the first width and the second ramped surface has a second length that is less than the first length.

7. The semi-automatic door closing apparatus of claim 6, wherein the semi-closed position is about 60 degrees from a fully closed position.

8. The semi-automatic door closing apparatus of claim 6, wherein the door moves under the door's own weight about 120 degrees from the open position to the semi-closed position.

* * * * *